Nov. 30, 1954          J. SZYDLOWSKI                2,695,498
         DEVICE FOR REGULATING THE FEEDING OF GAS TURBINES
                    Filed March 6, 1950
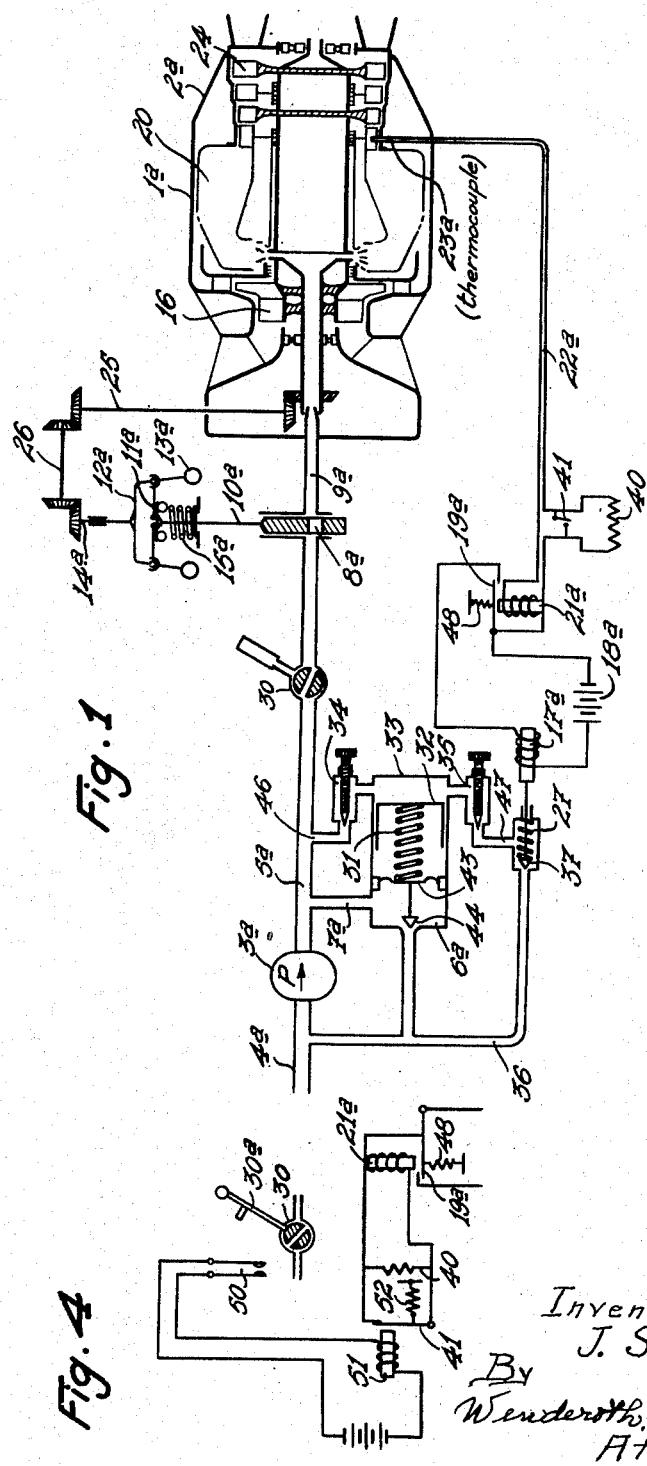
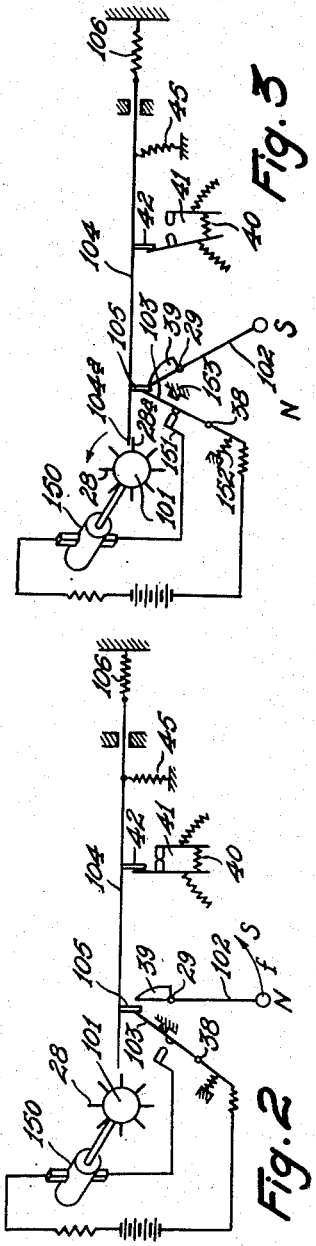
Inventor
J. Szydlowski
By
Wenderoth, Lind & Ponack,
Attorneys

United States Patent Office 2,695,498
Patented Nov. 30, 1954

2,695,498

DEVICE FOR REGULATING THE FEEDING OF GAS TURBINES

Joseph Szydlowski, Bordes, France

Application March 6, 1950, Serial No. 147,885

Claims priority, application France March 19, 1949

1 Claim. (Cl. 60—39.28)

Thermic engines as at present known are generally controlled through regulators that limit the admission of fuel in accordance with the speed of rotation that is reached. In the case of thermic engines, such as gas turbines or reaction jet engines, there should be taken into account in addition to the necessity of adjusting the speed of rotation, that of limiting directly or indirectly the temperature reached by the combustion gases, in order to prevent the wheels of the turbine that are vital elements thereof from being rapidly rendered unserviceable.

With a view to eliminating the drawbacks that would result from the absence of such regulating means, my invention has for its main object to provide for an adjustment of the temperature of the gases by means of a temperature responsive instrument actuating through suitable relays the members that adjust the amount of fuel fed to the engine.

A further object of the invention consists in providing in the case of a gas turbine or of a reaction jet engine, control means of the character described, wherein the limitation of the amount of fuel admitted into the thermic engine is obtained gradually through a progressive adjustment of the fuel input, said input being reduced when the temperature rises beyond the selected value, whereas it is caused to increase when said predetermined temperature is not reached.

This removes thus the drawback due to the fact that for such power engines, the incorporation of means comprising a regulator reducing suddenly the amount of fuel fed when the temperature rises beyond a predetermined value, leads to a sudden reduction in the combustion temperature and in the power developed, which sudden reduction is generally not allowable in practice.

The temperature responsive instruments are located preferably, in the case where they are used with a gas turbine or a reaction jet turbine stream, upwards with reference to the turbine, for instance at the output of the combustion chamber or chambers.

My invention has furthermore for its object the industrial application of the fuel feeding system disclosed chiefly in the case of gas turbines, reaction jet turbines, propeller turbines and more particularly in the case of those gas turbines that are described in my copending prior specification filed under Ser. No. 126,143 on November 8, 1949 (now abandoned) for "Coaxial Combustion Products Generator and Turbine," that includes more specifically a combustion chamber of the type disclosed in my other copending specification Ser. No. 126,141 filed on November 8, 1949 (now abandoned) for a "Combustion Chamber With Diverse Combustion and Diluent Air Paths."

The following description made with reference to the accompanying drawing will allow a proper understanding of the practical execution of my invention, the embodiment disclosed being given by way of a mere exemplification. In said drawing:

Fig. 1 illustrates diagrammatically an arrangement for adjusting the admission of fuel in a gas turbine by limitation of the amount of fuel in accordance with the temperature reached by the gases as they pass out of the combustion chamber of said turbine, said limitation being obtained gradually through the progressive adjustment of the throughput of fuel.

Figs. 2 and 3 are views in its open and closed position of an arrangement for controlling a switch defining the temperature of for which the adjusting means become operative.

Fig. 4 is a modification of Fig. 1.

The arrangement illustrated in Fig. 1 includes a turbojet engine having a compressor 16 which feeds an annular combustion chamber 20 housed inside the casing 1a, and delivering the combustion gases to a turbine 24 housed inside a casing 2a. The combustion chamber 20 is fed with fuel delivered by a pump 3a that sucks the fuel out of a container that is not illustrated through a pipe 4a. The pump 3a delivers the fuel through a pipe 5a. A valve 6a for adjusting the pressure of fuel delivered is inserted in a by-pass 7a connected across the pump 3a in order to provide liquid fuel under an adjustable constant pressure.

In the pipe 5a is inserted a slide valve 8a adapted to adjust the amount of fuel delivered into the pipe 9a. This pipe 9a feeds the combustion chamber 20. This slide valve 8a is connected through a rod 10a with the movable ring 11a of a centrifugal regulator 12a. The centrifugal weights 13a of the regulator 12a are driven into rotation through the spindle 14a that is connected to the rotary members of the turbine through a transmission 25—26 forming no part of the invention. The ring 11a of the regulator is urged by the return spring 15a towards its inoperative position in opposition to the centrifugal movement of said weights.

In the pipe 5a is also inserted a valve 30 controlled through a hand-operated lever for providing manually the feed of fuel. There is introduced info the exhaust for the combustion gases out of the combustion chamber 20 contained in the casing 1a, a thermocouple 23a that is inserted in series with the coil of a relay 21a through the agency of the leads 22a. In the circuit of said leads is inserted in series with said thermocouple a resistance 40 that may be short-circuited through a switch 41. A switch 19a acting as the movable armature for the relay 21a is inserted in series with the circuit of a source of electric current 18a, said circuit also including in series with the source the relay winding 17a controlling a valve 37 equipped with a release spring 27. The switch 19a allows current to pass through the winding 17a or to be switched off. The solenoid actuated valve 37 controlled by said winding 17a is inserted in a second by-pass 36 also connected across the pump 3a between the pipes 4a and 5a, the opening of said by-pass into the pipe 5a being located on the down-stream side of the by-pass 7a.

The pressure-controlling valve 6a includes a cylindrical chamber 33 within which is mounted a diaphragm 43 carrying the valve 44 adapted to close the first by-pass 7a. The diaphragm 43 is subjected to the action of a spring 31 the further end of which bears against a movable piston 32 sliding inside the chamber 33 and having an area greater than that of diaphragm 43. Said chamber 33 is connected through a pipe 46 including a manually adjustable needle valve 34 with the pipe 5a on one hand and on the other with a pipe 47 including a manually adjustable needle valve 35 which communicates with the chamber of the solenoid actuated valve 37. The by-pass 36 terminates thus in series with the valve 35, the chamber forming the cylinder 33 and the valve 34.

The operation of the arrangement described is as follows: when the temperature of the thermocouple 23a is less than the selected temperature, the winding 17a of the solenoid actuated valve 37 is not energized and consequently the valve 37 is closed under the action of release spring 27. As a matter of fact, the winding of the relay 21a is fed by a current that is not sufficient for closing the switch 19a by neutralizing the action of spring 48. The pressure of fuel inside the cylinder 33 is then equal to the pressure of fuel in the pipe 5a. Said pressure exerts on piston 32 a force greater than that exerted on diaphragm 43 and consequently said piston moves toward the left and the spring 31 is compressed to a maximum and maintains valve 44 in closed position. In this case, the adjustment of the flow of fuel to the combustion chambers is performed only through the speed regulator at 8a.

When the temperature of the thermocouple 23a reaches a predetermined value or rises beyond same, the relay 21a is sufficiently energized for neutralizing the action of spring 48 and the switch 19a forming the armature of said relay closes. The winding 17a is energized and the valve 37 opens. Consequently the part of chamber 33 which is connected to pipes 46 and 47 gradually empties through the valve 35 into the by-pass 36 and back into the inlet pipe 4a. This results in a decreasing of the pressure in said part of chamber 33. Piston 32 moves to the right under the action of spring 31 which may then expand, permitting valve 44 to open, under the action of the fluid pressure acting on the left side of diaphragm 43. This provides for a gradual lowering of the fuel pressure inside the pipe 5a until the temperature at the thermocouple 23a has dropped below the temperature selected. As a matter of fact, the fuel pressure is reduced in the pipes 5a and 9a and the amount of fuel admitted per unit of time into the combustion chamber decreases gradually; the temperature drops also at the output end of said chambers and consequently in the vicinity of the thermocouple. When the temperature at the thermocouple drops below the selected temperature, the relay 21a is no longer sufficiently energized and the switch 19a opens under the action of spring 48. The valve 37 closes again under the action of its spring as the winding 17a is no longer energized. Fuel fills again gradually the chamber 33 through the valve 34 and gradually compresses the spring 31 whereby the pressure in the pipe 5a increases also in a gradual manner and allows a progressive increase of the flow of fuel that feeds the combustion chamber. The combustion temperature rises then up to the desired value.

From this moment onwards, the precedingly described cycle may begin over again. Through an adjustment of the cross-sectional area of pipes 46 and 47 left free by the screwing of needle valves 34 and 35, said adjustment being made in accordance with the requirements of the arrangement, it is possible to reduce the oscillations of the actual combustion temperature to either side of the selected temperature within comparatively narrow limits.

In order to obtain extra power in the machine for the taking off of an aircraft on which the turbine 24 forms the power unit and for other similar purposes where it is desired to develop a temporary extra-power through a transient increase in the combustion temperature, it is possible to open the switch 41 in order to insert the resistance 40 in the circuit of the thermocouple 23a. This operation raises the temperature at which the relay 21a becomes operative.

It is possible to associate the operation of said switch 41 with that of the hand-operated adjusting valve 30 in order that the switch 41 may be opened only when the valve 30 is in its position of maximum opening as illustrated in Fig. 4. When the lower lever 30a of the hand-operated valve 30 is shifted to its position of maximum opening, it closes the switch 50 for energizing the electromagnet 51 which in turn opens switch 41 normally closed by spring 52. In order to avoid the overload thus obtained from lasting too long a time, the duration of opening of the contact 41 is limited as illustrated in Figs. 2 and 3 by a time switch. This time switch includes a clockwork having a motor 150 which provides for a slow rotation of a wheel 101 carrying a number of blades 28 and that stops automatically as explained hereinafter when one blade has assumed the position of the preceding blade as occurs when a predetermined time interval $t$ has elapsed. When it is desired to open the switch 41, the double arm lever 102 fulcrumed at 29 should be shifted from its position N towards its position S which has for result to urge towards the left the rod 104 through the agency of the stop 105 actuated by the cam 39 forming an arm of lever 102, while the lever 103 is simultaneously shifted angularly about its fulcrum 38 by means of stop 105 and the switch 41 is opened through the agency of a stop 42 carried by said rod 104. On the one hand, the end 104a of rod 104 is located above the blade 28a and, on the other hand, switch 151 is closed and the motor 150 starts and drives wheel 101 (Fig. 3). The blade 28a of the wheel 101 slowly raises the rod 104 against spring 45 and, after a short time that is less than the time $t$ referred to, stop 105 is shifted suddenly off the cam 39 of the lever 102 and the end 104a of rod 104 escapes from the blade 28a so that rod 104 is returned towards the right hand side of Fig. 3 by the spring 106 whereby the switch 41 is again closed across the terminals of the resistance 40. Simultaneously switch 151 is open under the action of spring 152 and the motor 150 stops, the displacement of lever 103 being limited by a stop 153.

When it is desired to open again the switch 41, it is necessary to return the lever into the position N and then to move it back towards S.

Obviously, without widening the scope of my invention, as defined in accompanying claim, it is possible to modify in various manners the embodiments that have just been disclosed.

More particularly, as concerns the wiring diagram of the arrangement, other arrangements may be resorted to, chiefly as concerns the means for amplifying the current produced by the thermocouple 23a and the time-lag system.

What I claim is:

In a heat engine, the provision of an arrangement for controlling the input of fuel into same including a feed pump and associated feed pipe adapted to deliver fuel into the engine, a first by-pass including an enlarged variable-size chamber having a movable wall, said by-pass being connected across the feed pump in shunt relationship with the fuel feed pipe, a second by-pass including a variable-size chamber having a movable wall, said second by-pass being also connected across the pump in shunt relationship with the feed pipe, the connection of the first by-pass with the feed pipe section between the feed pump and the engine being located on the upstream side of the connection between the second by-pass and the feed pipe section considered, means for yieldingly interengaging the movable walls of the two chambers, a valve carried by the movable wall of the first chamber and adapted to control the first by-pass to reduce the pressure of fuel delivered by the pump when the pressure in said second chamber drops and ensuring a reduction in pressure in the first chamber whenever the pressure drops in the second chamber, a valve adapted to close the second by-pass between the chamber therein and the upstream side of the feed pipe with reference to the feed pump, temperature-sensitive means inside the combustion chamber of the engine, an electric circuit controlled by said means according to the temperature assumed thereby, electromagnetic means controlled by said circuit and controlling the last mentioned valve to open, when the temperature considered rises above a predetermined value, the second by-pass and reduce thereby the pressure in the second chamber and thereby the throughput of fuel through the pipe.

References Cited in the file of this patent

UNITED STATES PATENTS

| Number | Name | Date |
|---|---|---|
| 2,336,232 | Doran | Dec. 7, 1943 |
| 2,404,428 | Bradbury | July 23, 1946 |
| 2,405,888 | Holley | Aug. 13, 1946 |
| 2,422,808 | Stokes | June 24, 1947 |
| 2,432,177 | Sédille | Dec. 9, 1947 |
| 2,589,074 | Goodwin | Mar. 11, 1952 |